United States Patent
Williams et al.

(10) Patent No.: US 12,496,953 B2
(45) Date of Patent: Dec. 16, 2025

(54) VEHICLE BASED DUAL ACCESS REFRIGERATION SPACE WITH CONVEYANCE

(71) Applicant: TOYOTA MOTOR ENGINEERING & MANUFACTURING NORTH AMERICA, INC., Plano, TX (US)

(72) Inventors: Paxton S. Williams, Milan, MI (US); Ryan C. Harris, Saline, MI (US); Keith O'Brien, Highland, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 430 days.

(21) Appl. No.: 18/186,099

(22) Filed: Mar. 17, 2023

(65) Prior Publication Data
US 2024/0308598 A1 Sep. 19, 2024

(51) Int. Cl.
*B60N 3/10* (2006.01)
*B62D 33/04* (2006.01)

(52) U.S. Cl.
CPC ........... *B60N 3/104* (2013.01); *B62D 33/048* (2013.01)

(58) Field of Classification Search
CPC .......... B60H 1/00; B60H 1/32; B60H 1/3205; B60N 3/104; B62D 33/048
USPC ............................................ 296/24.35, 37.8
See application file for complete search history.

(56) References Cited

U.S. PATENT DOCUMENTS

| | | | |
|---|---|---|---|
| 4,919,477 A | 4/1990 | Bingham | |
| 5,848,744 A | 12/1998 | Dischner | |
| 6,752,444 B2 * | 6/2004 | Kitano | B60R 11/0211 |
| | | | 296/65.09 |
| 10,266,091 B2 * | 4/2019 | Rotharmel | F25D 23/003 |
| 10,295,250 B2 * | 5/2019 | Buttolo | B60H 1/00264 |
| 11,148,574 B2 * | 10/2021 | Kim | B60N 3/104 |
| 11,260,727 B2 | 3/2022 | Ki | |
| 11,718,218 B2 * | 8/2023 | Qiu | B60P 3/20 |
| | | | 296/24.35 |
| 2021/0253012 A1 | 8/2021 | Bursch | |
| 2022/0055542 A1 | 2/2022 | Kane | |

FOREIGN PATENT DOCUMENTS

| | | |
|---|---|---|
| CN | 210335005 U | 4/2020 |
| CN | 210466538 U | 5/2020 |

* cited by examiner

*Primary Examiner* — Jason S Daniels
(74) *Attorney, Agent, or Firm* — SHEPPARD, MULLIN, RICHTER & HAMPTON LLP; Daniel N. Yannuzzi

(57) ABSTRACT

Systems and methods are provided for a dual-access refrigeration space with conveyance system. The dual-access refrigeration space being accessible from both inside and outside the passenger cabin of a vehicle, and the conveyance system capable of conveying objects within the dual-access refrigeration space. The conveyance of such objects enabling passengers of the vehicle to access refrigerated objects that may have been loaded from an area external to the passenger cab without the passengers needing to exit the vehicle. In some examples, such convention may be reversed such that the refrigeration space within a passenger cabin may be utilized by a user outside the passenger cabin.

10 Claims, 5 Drawing Sheets

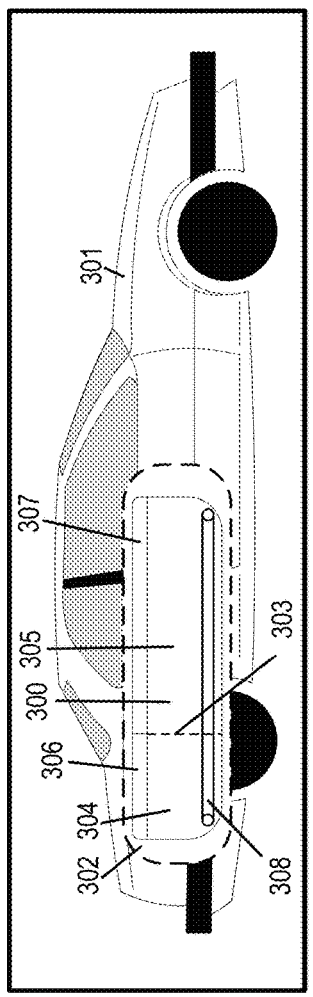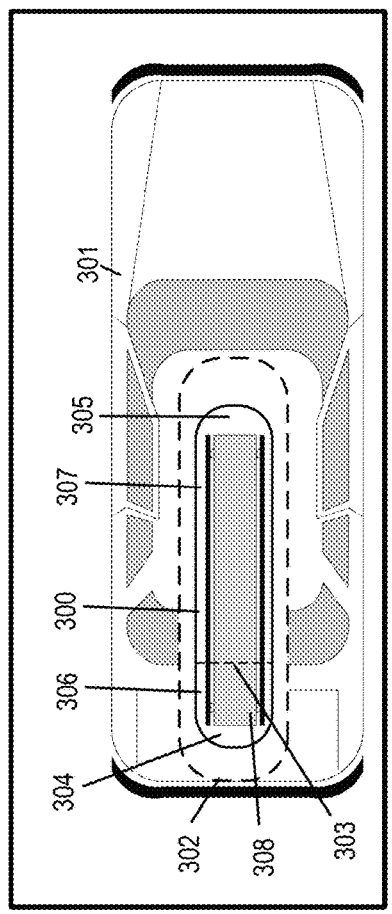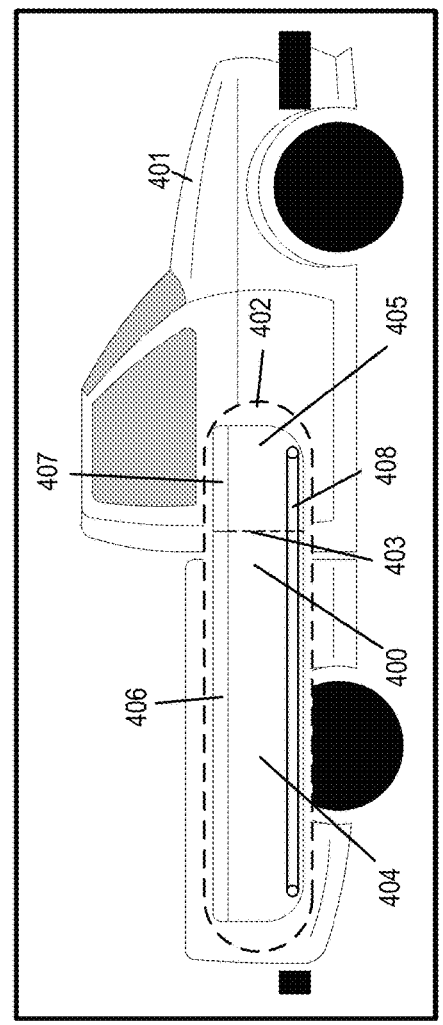

VEHICLE BASED DUAL ACCESS REFRIGERATION SPACE WITH CONVEYANCE

TECHNICAL FIELD

The present disclosure relates generally to systems and methods of providing refrigerated objects to users of vehicles, and in particular, some implementations may relate to systems and methods providing dual access refrigeration spaces.

DESCRIPTION OF RELATED ART

Vehicles may be designed such that they contain refrigerated spaces within the vehicle passenger cabin. Such refrigerated spaces may be used by passengers, drivers, etc. to store refrigerated objects, e.g., food, beverages, medicine, fishing bait. Passengers, drivers, etc. may access these refrigerated spaces from within the vehicle, where accessing may occur while the vehicle is in motion.

Vehicles may also be designed such that they contain refrigerated spaces external to the vehicle passenger cabin. Such refrigerated spaces may be used by passengers, drivers, etc. to again, store refrigerated objects. Passengers, drivers, etc. may access these externally located refrigerated spaces, and the objects contained inside, from outside the vehicle. In most cases, this may only occur while the external area of the vehicle is accessible, e.g., while the vehicle is parked.

BRIEF SUMMARY OF THE DISCLOSURE

According to various embodiments of the disclosed technology, a dual access refrigeration space comprises: a refrigerated cab portion located within a passenger cabin of a vehicle, the refrigerated cab portion being accessible within the passenger cabin of the vehicle, a refrigerated non-cab portion located outside the passenger cabin of the vehicle, the refrigerated non-cab portion being accessible outside the passenger cabin of the vehicle, and a conveyance system configured to convey objects between the non-cab portion and the cab portion.

In some embodiments, the cab portion is covered by an internal lid, the internal lid capable of being opened by a user within the cab, and the non-cab portion is covered by an external lid, the external lid capable of being opened by a user outside the passenger cabin.

In some embodiments, the dual access refrigeration space further comprises: an internal lid actuator communicatively coupled to a dual access refrigeration space control circuit, such that the internal lid may be opened or closed by the dual access refrigeration space control circuit via the internal lid actuator, and an external lid actuator communicatively coupled to the dual access refrigeration space control circuit, such that the external lid may be opened or closed by the dual access refrigeration space control circuit via the external lid actuator.

In some embodiments, the dual access refrigeration space further comprises: an internal lid latch sensor communicatively coupled to a dual access refrigeration space control circuit, such that the dual access refrigeration space control circuit may detect when the internal lid has been opened or closed via the internal lid latch sensor, and an external lid latch sensor communicatively coupled to the dual access refrigeration space control circuit, such that the dual access refrigeration space control circuit may detect when the external lid has been opened or closed via the external lid latch sensor.

In some embodiments, the dual access refrigeration space further comprises: a cab portion presence sensor communicatively coupled to a dual access refrigeration space control circuit, such that the dual access refrigeration space control circuit may detect the presence of objects within the cab portion via the cab portion presence sensor, and a non-cab portion presence sensor communicatively coupled to the dual access refrigeration space control circuit, such that the dual access refrigeration space control circuit may detect the presence of objects within the non-cab portion via the non-cab portion presence sensor.

In some embodiments, the dual access refrigeration space further comprises a temperature gauge communicatively coupled to a dual access refrigeration space control circuit, such that the dual access refrigeration space control circuit may detect a temperature within the dual access refrigeration space.

In some embodiments, the dual access refrigeration space further comprises a dual access refrigeration space cooling system communicatively coupled to a dual access refrigeration space control circuit, such that the dual access refrigeration space control circuit may increase or decrease a temperature within the dual access refrigeration space via the dual access refrigeration space cooling system.

In some embodiments, the dual access refrigeration space further comprises a conveyor belt with a motor communicatively coupled to a dual access refrigeration space control circuit, such that the dual access refrigeration space control circuit may convey objects from the cab portion to the non-cab portion, or from the non-cab portion to the cab portion, via the motor.

In some embodiments, the conveyance system comprises a spring and cable system.

According to various embodiments of the disclosed technology, a method comprises: receiving, at a processor, a first sensor data indicating an external lid of a dual access refrigeration space has been opened and closed, receiving, at a processor, a second sensor data indicating the presence of objects within a non-cab portion of a dual access refrigeration space, sending control data to a conveyance system within the dual access refrigeration space after receiving the first and second sensor data, such that objects within the non-cab portion of the dual access refrigeration space are conveyed to a cab portion of the dual access refrigeration space, and, after receiving sensor data indicating the presence of objects within the cab portion of the dual access refrigeration space, sending control data to the conveyance system such that the conveyance system ceases conveying objects from the non-cab portion of the dual access refrigeration space to the cab portion of the dual access refrigeration space.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3A illustrates an example dual access refrigeration space implemented within a coupe, viewed from the side, in accordance with one embodiment of the systems and methods described herein.

FIG. 3B illustrates an example of dual access refrigeration space implemented within a coupe, viewed from above, in accordance with one embodiment of the systems and methods described herein.

FIG. 4 illustrates an example of dual access refrigeration space implemented within a truck, viewed from the side, in accordance with one embodiment of the systems and methods described herein.

Figure 1:
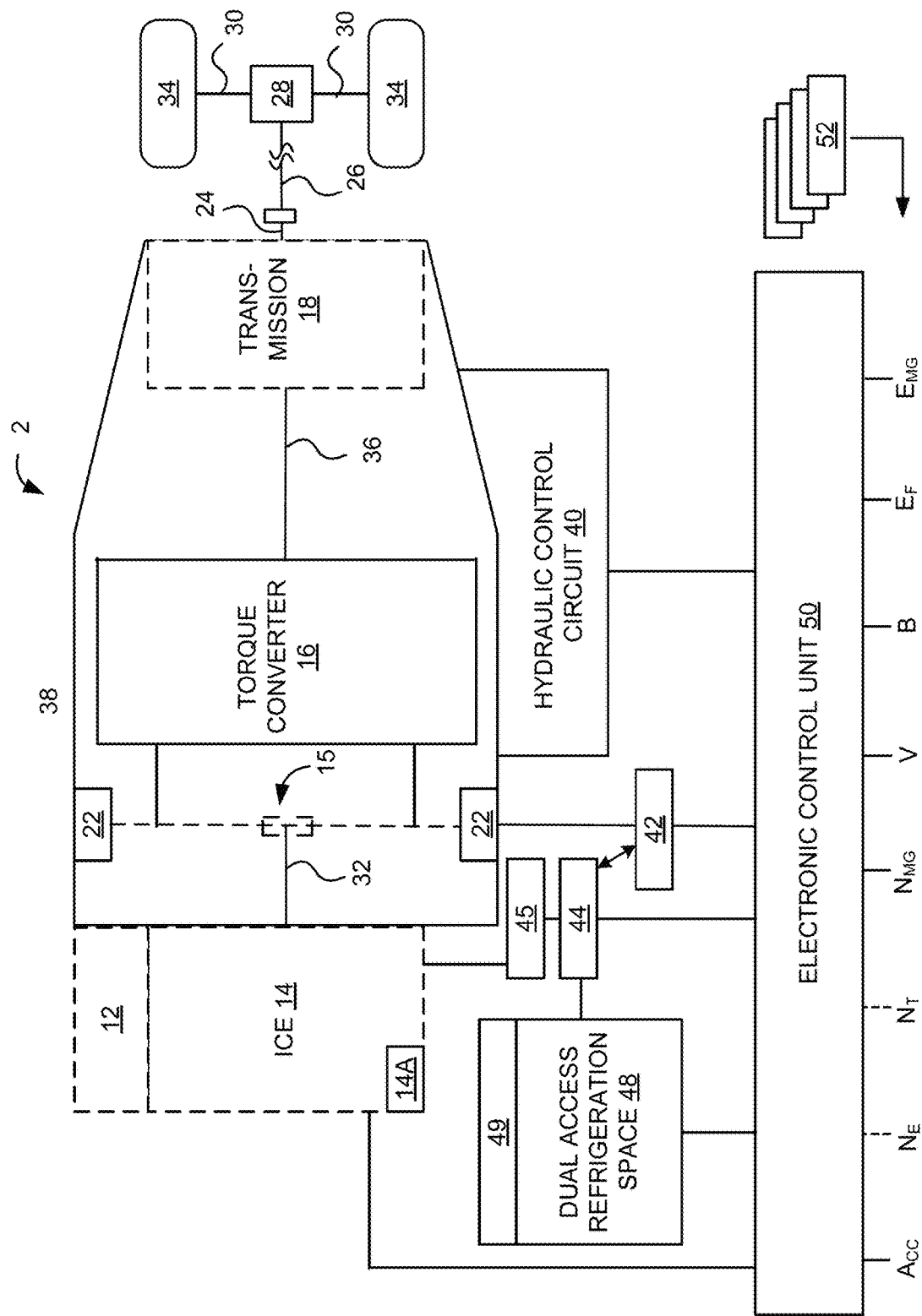
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Embodiments of the systems and methods disclosed herein can provide a dual access refrigeration space. Where a user (e.g. a driver, a passenger, a worker tasked with loading a vehicle) wishes to refrigerate objects within a vehicle, they may wish to have access to the same objects from within the vehicle regardless of where the objects were loaded into the vehicle. The systems and methods disclosed herein may be implemented to provide for a dual access refrigeration space, wherein the dual access refrigeration space may be accessed from both inside and outside the passenger cabin.

As disclosed in further detail regarding FIGS. 1-6 below, access to the same refrigerated objects from both inside and outside the passenger cabin is provided by locating the refrigeration space such that a portion of the refrigeration space is accessible from within the passenger cabin (the "cab portion") and a portion of the refrigeration space is accessible from outside the passenger cabin (the "non-cab portion"). Because the cab portion and the non-cab portion share the same refrigeration space, objects placed within the non-cab portion may be additionally accessed by a user inside the passenger cabin. Access to the non-cab portion by a user inside the passenger cabin may be achieved by first conveying the objects from the non-cab portion to the cab portion, and/or by the user reaching into the non-cab portion from the cab portion. In some embodiments, access to the cab portion by a user outside the passenger cabin may be achieved by first conveying the objects from the cab portion to the non-cab portion, and/or by the user reaching into the cab portion from the non-cab portion. Where "cab" is used herein, it is to be understood as shorthand for "cabin."

Such multiple modes of access allow a user to unload the dual access refrigeration space without having to out of the cab, even where the dual access refrigeration space was loaded from outside the passenger cabin. In addition, users may unload the dual access refrigeration space without having to get in the cab, even where the dual access refrigeration space was loaded from inside the passenger cabin. In some embodiments, two separate lids may be placed on the dual access refrigeration space, such that an external lid provides access to the non-cab portion of the dual access refrigeration space, and an internal lid provides access to the cab portion of the dual access refrigeration space.

Further, a conveyance system may be disposed within the dual access refrigeration space, such that objects placed in the non-cab portion of the dual access refrigeration space may conveyed to the cab portion of the dual access refrigeration space. In some examples, the conveyance system may be reversed, such that objects placed in the cab portion of the dual access refrigeration space may be conveyed to the non-cab portion of the dual access refrigeration space. Notably, the conveyance system allows passengers inside the passenger cabin to access objects originally located in the non-cab portion without exiting the passenger cabin or reaching into the non-cab portion. The conveyance system additionally allows users outside the passenger cabin to access objects originally located in the cab portion without entering the passenger cabin or reaching into the cab portion.

Sensors, actuators, motors, cooling systems and thermometers may be implemented within the dual access refrigeration space and connected to a dual access refrigeration space control circuit. The dual access refrigeration space control circuit may use the sensors to detect placement of objects within the dual access refrigeration space. The dual access refrigeration space control circuit may use the actuators to open and/or close lids of the dual access refrigeration space. The dual access refrigeration space control circuit may use the motors to activate conveyance systems within the dual access refrigeration space to convey objects from one portion of the dual access refrigeration space to another. The dual access refrigeration space control circuit may use the cooling systems and thermometers to check and regulate the temperature within the dual access refrigeration space. The dual access refrigeration space control circuit or other related systems may further provide a mechanism for a user to interface with the control circuit and control the associated dual access refrigeration space systems, motors, and/or actuators. The interface may include any method of interfacing with a user, e.g., a touchscreen, a mouse and keyboard, voice recognition software.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for providing a dual access refrigeration space can be implemented in other types of vehicle including gasoline- or diesel-powered vehicles, fuel-cell vehicles, electric vehicles, or other vehicles.

FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, nickel-metal hydride batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

Battery 44 may power a dual access refrigeration space 48. Dual access refrigeration space 48, described in more detail below, provides a place to store refrigerated objects. In some embodiments, dual access refrigeration space is oriented and structured in a way that a first portion of the dual access refrigeration space is accessible from outside the passenger cabin of the vehicle 2, and a second portion of the dual access refrigeration space is accessible from inside the passenger cabin of the vehicle 2. In some embodiments, the dual access refrigeration space 48 comprises a conveyance system 49, such that objects may be conveyed from the first portion to the second portion, or vice-versa. Dual access refrigeration space 48, conveyance system 49. In some embodiments, the dual access refrigeration space 48 may contain a thermoelectric cooling system to maintain refrigeration of objects within the first and/or second portions. In some embodiments, the dual access refrigeration space 48 may contain compartments to keep previously cooled material (e.g. ice, cooling packs), wherein the separately cooled material maintain refrigeration of the objects. In some embodiments, dual access refrigeration space 48 may be cooled by tapping into a component of another of vehicle 2's systems (e.g., cooling system 12). In some embodiments, dual access refrigeration space 48 may be powered by its own power circuit receiving energy from another system in vehicle 2 (e.g., motor 22).

Conveyance system 49 may comprise any known system for moving objects from one location to another, e.g., a cable and wand spring system, a rotating tray system, a conveyor belt system. In the disclosure herein, the conveyance system 49 is illustrated as powered by an electric motor. In some embodiments, the conveyance system 49 may be powered via other means, e.g., human power, mechanical power. In some embodiments, slots (e.g. cup holders) may be fixed to the conveyance system such that objects may remain movable by the conveyance system without allowing the objects to shift within the refrigerated space due to acceleration or deceleration of the vehicle.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42. Electronic control unit 50 may also actuate or receive input from sensors and/or actuators housed within dual access refrigeration space 48, e.g., lid latch sensors, lid actuators, conveyance system motors, temperature gauges, presence sensors, dual access refrigeration space cooling system.

A torque converter 16 can be included to control the application of power from engine 14 and motor 22 to transmission 18. Torque converter 16 can include a viscous fluid coupling that transfers rotational power from the motive power source to the driveshaft via the transmission.

Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, NE, of internal combustion engine 14 (engine RPM), a rotational speed, $N_{MG}$, of the motor 22 (motor rotational speed), and vehicle speed, $N_V$. These may also include torque converter 16 output, NT (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, lid latch sensors, temperature gauges, presence sensors, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Sensors 52 may include sensors related to the dual access refrigeration space 48, e.g., lid latch sensors, temperature gauges, presence sensors. Lid latch sensors may detect when a user has opened a lid on the dual access refrigeration space 48. Lid latch sensors may be present on lids external to the vehicle passenger cabin as well as on lids internal to the vehicle passenger cabin. Temperature gauges may detect the temperature within the dual access refrigeration space 48, giving the ECU 50 visibility on whether refrigeration of objects within the dual access refrigeration space is being maintained. Presence sensors may be placed in the external or internal portions of the dual access refrigeration space 48, wherein the presence sensors detect the presence of objects in the external or internal portions of the dual access refrigeration space 48. In some embodiments, presence of objects may be detected by any known means for detecting the presence of physical objects, e.g., lidar, sonar, temperature gauges, mechanical touch, user-indication, electrical scales.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
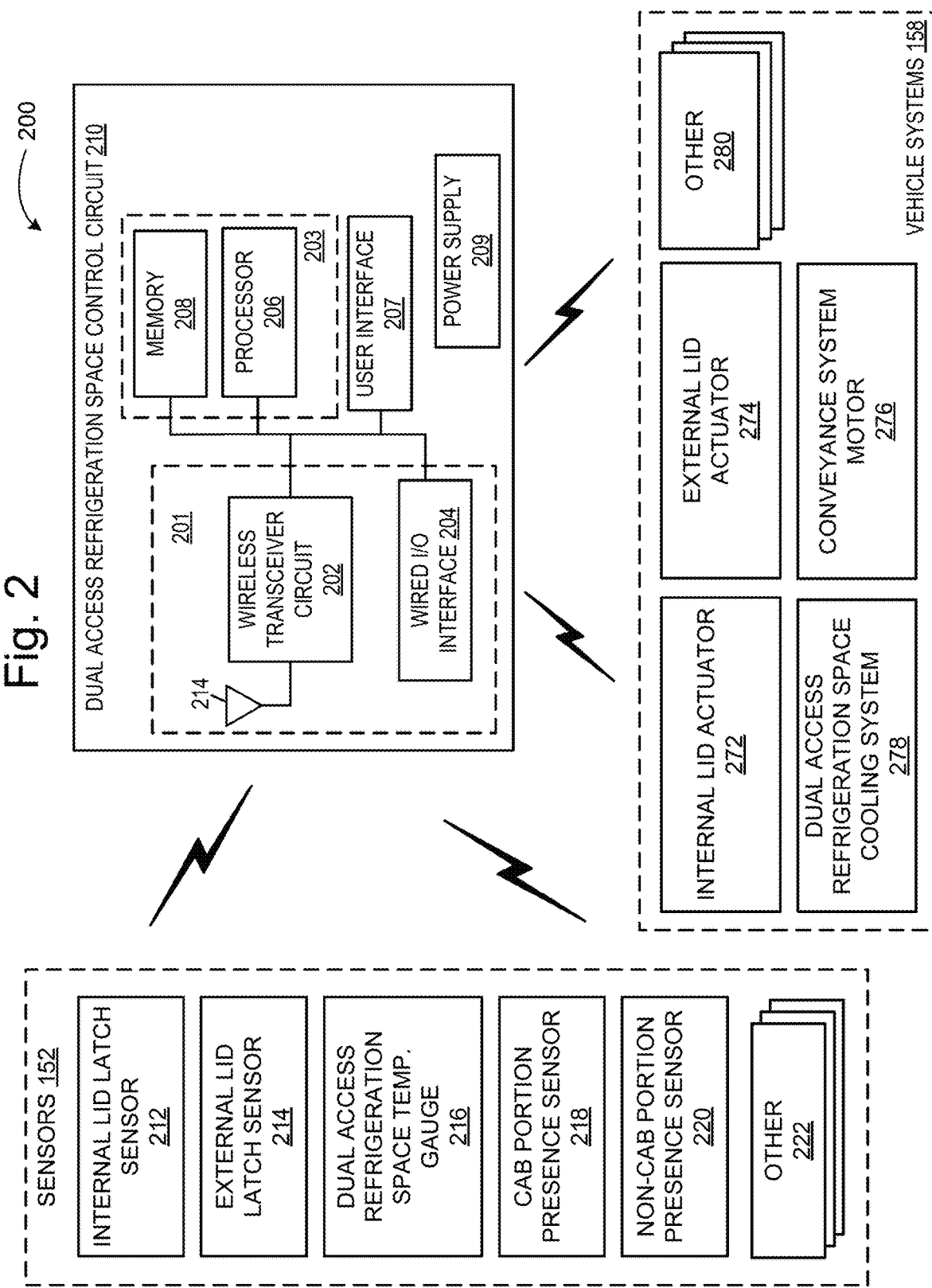
FIG. 2 illustrates an example architecture for providing a dual access refrigeration space in accordance with one embodiment of the systems and methods described herein.

FIG. 2 illustrates an example architecture for providing a dual access refrigeration space in accordance with one embodiment of the systems and methods described herein. Referring now to FIG. 2, in this example, dual access refrigeration space 200 includes a dual access refrigeration space control circuit 210, a plurality of sensors 152 and a plurality of vehicle systems 158. Sensors 152 and vehicle systems 158 can communicate with dual access refrigeration space control circuit 210 via a wired or wireless communication interface. Although sensors 152 and vehicle systems 158 are depicted as communicating with dual access refrigeration space control circuit 210, they can also communicate with each other as well as with other vehicle systems. Dual access refrigeration space control circuit 210 can be implemented as an ECU or as part of an ECU such as, for example electronic control unit 50. In other embodiments, dual access refrigeration space control circuit 210 can be implemented independently of the ECU, e.g., within the dual access refrigeration space itself. In some embodiments, dual access refrigeration space control circuit 210 is excluded. For instance, where the dual access refrigeration space maintains refrigeration via previously cooled materials stored in the dual access refrigeration space. In examples where, the conveyance system is powered by a user accessing the dual access refrigeration space, the dual access refrigeration space control circuit 210 may be excluded.

Dual access refrigeration space control circuit 210 in this example includes a communication circuit 201, a decision circuit 203 (including a processor 206 and memory 208 in this example), a user interface 207, and a power supply 209. Components of dual access refrigeration space control circuit 210 are illustrated as communicating with each other via a data bus, although other communication in interfaces can be included.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 of dual access refrigeration space control circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a dual access refrigeration space control circuit 210.

Communication circuit 201 can comprise either or both a wireless transceiver circuit 202 with an associated antenna 205 and a wired I/O interface 204 with an associated hardwired data port (not illustrated). As this example illustrates, communications with dual access refrigeration space control circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 205 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by dual access refrigeration space control circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

User interface 207 may include any system for receiving input from a user, e.g., a mouse and keyboard, a touch screen, a voice recognition system. In some embodiments, the user interface 207 may be located remotely from the dual access refrigeration space control circuit, with inputs communicated to the dual access refrigeration space control circuit via the communication circuit 201. The user interface 207 enables a user to control the systems and methods provided herein, e.g., command that a lid on the dual access refrigeration space open, command that the conveyance system move objects within the dual access refrigeration space. The user interface 207 may also be used to display, e.g., via a monitor, the status of the dual access refrigeration space, e.g., the temperature within the dual access refrigeration space, the presence of objects within the dual access refrigeration space. A user may include anyone associated with the vehicle, e.g. a passenger, a driver, a non-occupant tasked with loading the vehicle.

Power supply 209 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on a standard vehicle 10 with which the dual access refrigeration space 200 is implemented. In the illustrated example, sensors 152 include internal lid latch sensor 212, external lid latch sensor 214, dual access refrigeration space temperature gauge 216, cab portion presence sensor 218, and non-cab portion presence sensor 220. Additional sensors 222 can also be included as may be appropriate for a given implementation of dual access refrigeration space 200.

As described further below in relation to FIGS. 3-4, the dual access refrigeration space houses objects and has a cab portion and non-cab portion. In the disclosed embodiment, no internal separation exists between the cab and non-cab portions. Accordingly, refrigeration within both portions of the dual access refrigeration space may be maintained by the same cooling system. Further, objects placed in the dual access refrigeration space may be accessed by users inside the passenger cabin as well as users outside the passenger cabin. Users in the passenger cabin may access the cab portion of the dual access refrigeration space via a lid covering the cab portion (the "internal lid"). Users outside the passenger cabin may access the non-cab portion of the dual access refrigeration space via a lid covering the non-cab portion (the "external lid"). Objects may be conveyed from the cab portion to the non-cab portion by a cab portion by a conveyance system.

As such, the disclosed embodiment includes internal lid latch sensor 212 to detect whenever the internal lid is actuated and relay related signals to the dual access refrigeration space control circuit 210. The disclosed embodiment also includes an external lid latch sensor 214 to detect whenever the external lid is actuated and relay related signals to the dual access refrigeration space control circuit 210. The lid latch sensors 212-214 may comprise any mechanism for detecting actuation of a latch or lid, e.g., infrared beam obstruction, electrical switch, magnetic alignment. In some embodiments, one or more of the lid latch sensors 212-214 may be excluded entirely, or more than two may be included.

Some embodiments include a dual access refrigeration space temperature gauge 216 to detect a current temperature within the dual access refrigeration space and relay related signals to the dual access refrigeration space control circuit. The dual access refrigeration space temperature gauge 216 may comprise any mechanism for detecting temperature, e.g., thermocouples, resistance temperature detectors, thermistors. In some embodiments, there may be more than one temperature gauge, e.g., one for each portion, or no temperature gauge at all.

The disclosed embodiment includes cab portion presence sensor 218 to detect and relay related signals to the dual access refrigeration space control circuit 210 regarding the presence of objects within the cab portion. The disclosed embodiment also includes non-cab portion presence sensor 220 to detect and relay related signals to the dual access refrigeration space control circuit 210 regarding the presence of objects within the non-cab portion. The presence sensors 218-220 may comprise any mechanism for detecting the presence of objects, e.g., infrared beam obstruction, electrical switch, spring scales, strain gauge, hall-effect sensor. In some embodiments, one or more of the presence sensors 218-220 may be excluded entirely, or more than two may be included.

Vehicle systems 158 can include any of a number of different vehicle components or subsystems used to control or monitor various aspects of the vehicle and its performance. In this example, the vehicle systems 158 include in internal lid actuator 272, external lid actuator 274, conveyance system motor 276, dual access refrigeration space cooling systems 278, and other vehicle systems 282.

As such, the disclosed embodiment includes internal lid actuator 272 to allow control signals from the dual access refrigeration space control circuit 210 to open the internal lid of the dual access refrigeration space. The disclosed embodiment also includes external lid actuator 274 to allow electrical signals from the dual access refrigeration space control circuit 210 to open the external lid of the dual access refrigeration space. The lid actuators 272-274 may comprise any mechanism for actuating lids, e.g., pneumatic, hydraulic, electrical, linear, rotational. In some embodiments, one or more of the presence sensors 272-274 may be excluded entirely, or more than two may be included.

The disclosed embodiment includes conveyance system motor 276 to allow control signals from the dual access refrigeration space control circuit 210 to operate the conveyance system, moving objects from the non-cab portion to the cab portion, and/or vice versa. Conveyance system motor 276 which may operate any mechanism for relocating objects, e.g., a linear actuator attached to a cable and spring system, a rotational motor attached to a rotating tray, a rotational motor attached to a drum of a conveyor belt system. In some embodiments, the conveyance system motor 276 may be excluded entirely, e.g., where the conveyance system is human powered, or more than one conveyance system motor may be included.

The disclosed embodiment includes dual access refrigeration space cooling system 278 to allow control signals from the dual access refrigeration space control circuit 210 to operate the maintenance of refrigeration within the dual access refrigeration space. Dual access refrigeration space cooling system 278 may comprise any mechanism for maintaining a desired temperature within a space, e.g., thermoelectric, mechanical-compression, absorption refrigeration, evaporation. In some embodiments, the dual access refrigeration space cooling system 278 may be excluded entirely, e.g., where refrigeration is provided via a previously cooled material, and/or where the dual access refrigeration system is cooled via an existing cooling system of the vehicle. In some embodiments, more than one dual access refrigeration space cooling system may be provided, e.g., to separately cool cab and non-cab portions.

During operation, dual access refrigeration space control circuit 210 may receive information from various vehicle sensors and gauges to determine whether to actuate lids related to the dual access refrigeration space, whether to move objects from the non-cab portion to the cab portion, and/or whether to engage cooling systems within the dual access refrigeration space. Also, a user may activate the vehicle systems 158 via the user interface 207. Communication circuit 201 can be used to transmit and receive information between dual access refrigeration space control circuit 210 and sensors 152, and dual access refrigeration space control circuit 210 and vehicle systems 158. Also, sensors 152 may communicate with vehicle systems 158 directly or indirectly (e.g., via communication circuit 201 or otherwise). In various embodiments, communication circuit 201 can be configured to receive data and other information from sensors 152 that is used in determining whether to take actions relating to the dual access refrigeration space, e.g. operating vehicle systems 158. Additionally, communication circuit 201 can be used to send an activation signal or other activation information to various vehicle systems 158 as part of such determined actions. The decision regarding what action to take via these various vehicle systems 158 can be made based on the information detected by sensors 152. Examples of this are described in more detail below.

FIGS. 3A, 3B, and 4 each illustrate an example of a dual access refrigeration space contemplated by embodiments of the disclosed technology. Although the examples disclosed herein are implemented within coupe and truck vehicle types, the disclosed systems and methods can be implemented within any vehicle, e.g. a boat, a sedan, an SUV. Further, the particular arrangements and configurations disclosed are not limited to the type of vehicle disclosed.

FIG. 3A illustrates an example of a dual access refrigeration space 300 implemented within a coupe 301, viewed from the side. Because the dual access refrigeration space 300 is located within the coupe 301, a cutaway 302 is illustrated to assist in visualizing the location of the dual access refrigeration space 300 within coupe 301. The cutaway 302 is for visualization purposes only, no actual physical hole is meant to be part of the disclosed examples. As can be seen within cutaway 302, a dashed line labeled 303 delineates non-cab portion 304 from cab portion 305 (recalling that no physical divider or separator exists between non-cab portion 304 and cab portion 305.)

As discussed above, refrigeration of may be shared between non-cab portion 304 and cab portion 305. In other examples, compartments or physical barriers may be placed within dual access refrigeration space 300. In some examples, a temperature gauge may be placed within dual access refrigeration space 300 so that the temperature within non-cab portion 304 and cab portion 305 can be detected by an example dual access refrigeration space control circuit. In some examples, a cooling system may be maintained by a system connected to an example dual access refrigeration space control circuit so that the refrigeration within non-cab portion 304 and cab portion 305 can be computer-controlled.

In some examples, dual access refrigeration space 300 may be cooled by pre-cooled materials, e.g., ice, placed within the dual access refrigeration space by a user.

External lid 306 provides access to the non-cab portion 304, and may be opened by a user with access to the trunk of coupe 301. A user may lift (or otherwise open/actuate in some way to open) external lid 306 in order to place or retrieve objects within the non-cab portion 304. In some examples, an external lid latch sensor may be placed on dual access refrigeration space 300 so that opening and closing of external lid 306 may be detected by an example dual access refrigeration space control circuit. In some examples, a non-cab portion presence sensor may be positioned within non-cab portion 304 to detect the presence of objects within non-cab portion 304. In some examples, an external lid actuator may be placed on dual access refrigeration space 300 so that opening and closing of external lid 306 may be completed via control signals from an example dual access refrigeration space control circuit.

Internal lid 307 provides access to the cab portion 305, and may be opened by a user with access to the passenger cabin of coupe 301. A user may lift internal lid 307 in order to place or retrieve objects within the cab portion 305. In some examples, an internal lid latch sensor may be placed on dual access refrigeration space 300 so that opening and closing of internal lid 307 may be detected by an example dual access refrigeration space control circuit. In some examples, a cab portion presence sensor may be positioned within cab portion 305 to detect the presence of objects within cab portion 305. In some examples, an internal lid actuator may be placed on dual access refrigeration space 300 so that opening and closing of internal lid 307 may be completed via control signals from an example dual access refrigeration space control circuit.

Along the bottom of dual access refrigeration space 300 runs a conveyance system 308. Conveyance system 308 moves objects from non-cab portion 304 to cab portion 305, or vice versa. Where objects have moved from non-cab portion 304 to cab portion 305, conveyance system 308 allows a user to access objects placed within non-cab portion 304 from within the passenger cabin via internal lid 307. In some examples, a user may access objects placed within cab portion 305 from outside the passenger cabin via external lid 306, provided the objects have been moved from cab portion 305 to non-cab portion 304 first. Note that the conveyance system 308 within a dual access refrigeration space 300 improves spatial utilization of the vehicle and of the dual access refrigeration space 300; Users both outside and inside the vehicle are permitted to access refrigerated objects stored in areas normally outside of the users' reach, e.g., the trunk for cabin passengers, the cabin for users accessing the trunk.

Conveyance system 308 is disclosed herein as a conveyor belt system, with the conveyor belt motor connected to a dual access refrigeration space control circuit, so that the relocation of objects between non-cab portion 304 and cab portion 305 can be completed by computer control, and/or user control via a user interface. In some examples, conveyance system 308 may comprise any mechanism for relocating objects, e.g., a wand spring and cable system, a rotating tray, a sliding plate. In some examples, conveyance system 308 may be unmotorized, and may instead be powered by the user wishing to access objects within the dual access refrigeration space 300.

FIG. 3B illustrates an example of dual access refrigeration space implemented within a coupe 301, viewed from above. As can be seen from this perspective, the dual access refrigeration space 300 is located roughly along the centerline of coupe 301. In some examples, dual access refrigeration space 300 may instead be offset or shaped to occupy different areas of coupe 301. In all examples, a non-cab portion 304 and a cab portion 305 remain, e.g., a portion of the dual access refrigeration space 300 remains disposed within the trunk and a portion of dual access refrigeration space 300 remains disposed within the passenger cabin of the coupe 301. Further, the disclosed example depicts internal lid 307 extending past the rear seats and into the front seats of coupe 301. In some examples, dual access refrigeration space 300 may instead not extend so far toward the front of the vehicle, only being accessible by users within the rear of the passenger cabin.

FIG. 4 illustrates an example of dual access refrigeration space 400 implemented within a truck 401, viewed from the side. Because the dual access refrigeration space 400 is located within the truck 401, a cutaway 402 is illustrated to assist in visualizing the location of the dual access refrigeration space 400 within truck 401. The cutaway 402 is for visualization purposes only, no actual physical hole is meant to be part of the disclosed examples. As can be seen within cutaway 402, a dashed line labeled 403 delineates non-cab portion 404 from cab portion 405 (recalling that no physical divider or separator exists between non-cab portion 404 and cab portion 405).

As discussed above, refrigeration may be shared between non-cab portion 404 . . . . In other examples, compartments or physical barriers may be placed within dual access refrigeration space 400. In some examples, a temperature gauge may be placed within dual access refrigeration space 400 so that the temperature within non-cab portion 404 and cab portion 405 can be detected by an example dual access refrigeration space control circuit. In some examples, a cooling system may be maintained by a system connected to an example dual access refrigeration space control circuit so that the refrigeration within non-cab portion 404 and cab portion 405 can be computer-controlled. In some examples, dual access refrigeration space 400 may be cooled by pre-cooled materials, e.g., ice, placed within the refrigeration space by a user.

External lid 406 provides access to the non-cab portion 404, and may be opened by a user with access to the truck bed of truck 401. A user may lift external lid 406 in order to place or retrieve objects within the non-cab portion 404. In some examples, an external lid latch sensor may be placed on dual access refrigeration space 400 so that opening and closing of external lid 406 may be detected by an example dual access refrigeration space control circuit. In some examples, a non-cab portion presence sensor may be positioned within non-cab portion 404 to detect the presence of objects within non-cab portion 404. In some examples, an external lid actuator may be placed on dual access refrigeration space 400 so that opening and closing of external lid 406 may be completed via control signals from an example dual access refrigeration space control circuit.

Internal lid 407 provides access to the cab portion 405, and may be opened by a user with access to the passenger cabin of truck 401. A user may lift internal lid 407 in order to place or retrieve objects within the cab portion 405. In some examples, an internal lid latch sensor may be placed on dual access refrigeration space 400 so that opening and closing of internal lid 407 may be detected by an example dual access refrigeration space control circuit. In some examples, a cab portion presence sensor may be positioned within cab portion 405 to detect the presence of objects within cab portion 405. In some examples, an internal lid actuator may be placed on dual access refrigeration space 400 so that opening and closing of internal lid 407 may be completed via control signals from an example dual access refrigeration space control circuit.

Along the bottom of dual access refrigeration space 400 runs a conveyance system 408. Conveyance system 408 moves objects from non-cab portion 404 to cab portion 405, or vice versa. Where objects have moved from non-cab portion 404 to cab portion 405, conveyance system 408 allows a user to access objects placed within non-cab portion 404 from within the passenger cabin via internal lid 407. In some examples, a user may access objects placed within cab portion 405 from outside the passenger cabin via external lid 406, provided the objects have been moved from cab portion 405 to non-cab portion 404 first. Note that the conveyance system 408 within a dual access refrigeration space 400 improves spatial utilization of the vehicle and of the dual access refrigeration space 400. Users both outside and inside the vehicle are permitted to access refrigerated objects stored in areas normally outside of the users' reach, e.g., the truck bed for cabin passengers, the cabin for users accessing the truck bed.

Conveyance system 408 is disclosed herein as a conveyor belt system, with the conveyor belt motor connected to a dual access refrigeration space control circuit, so that the relocation of objects between non-cab portion 404 and cab portion 405 can be completed by computer control, and/or user control via a user interface. In some examples, conveyance system 408 may comprise any mechanism for relocating objects, e.g., a wand spring and cable system, a rotating tray, a sliding plate. In some examples, conveyance system 408 may be unmotorized, and may instead be powered by the user wishing to access objects within the dual access refrigeration space 400, e.g. by hand rotation of a rotating tray, by pulling on a sliding plate.

No overhead perspective is provided for dual access refrigeration space 400, however it can be understood by analogy to coupe 301 in FIGS. 3A-B, that the dual access refrigeration space may be disposed roughly along the centerline of truck 401. In some examples, dual access refrigeration space 400 may instead be offset or shaped to occupy different areas of truck 401. In all examples, a non-cab portion 404 and a cab portion 405 remain, e.g., a portion of the dual access refrigeration space 400 remains disposed within the truck bed and a portion of dual access refrigeration space 400 remains disposed within the passenger cabin of truck 401. Further, the disclosed example depicts external lid 406 extending for the full length of truck 401's bed. In some examples, dual access refrigeration space 400 may instead not extend so far toward the rear of the vehicle, only utilizing a portion of the length of truck 401's bed.

Figure 5:
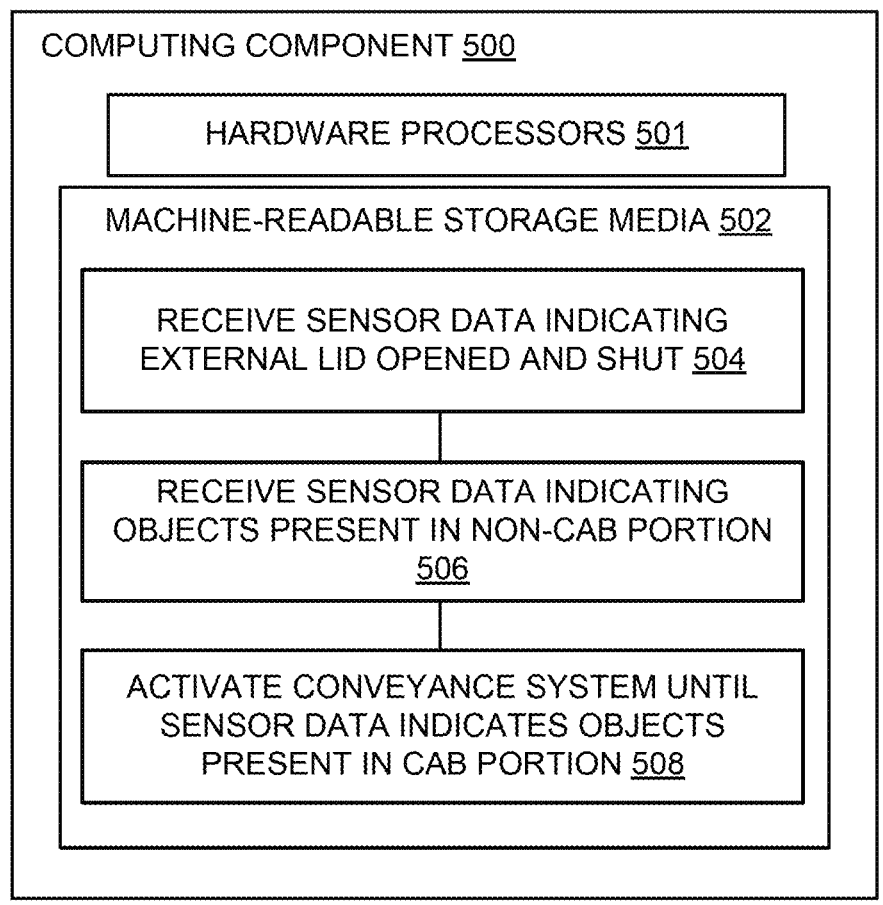
FIG. 5 illustrates an example computing component 500 that may be used to implement an example method of conveying refrigerated objects between the cab portion and non-cab portion of a dual access refrigeration space.

FIG. 5 illustrates an example computing component 500 that may be used to implement methods associated with a dual access refrigeration space. Computing component 500 may be a part of decision circuit 203 as illustrated relating to FIG. 2 above. In some examples, computing component 500 may be a separate system from decision circuit 203. Computing component 500 includes hardware processor(s) 501 and machine-readable storage medium (media) 502.

Hardware processor(s) 501 may be analogous to processor(s) 206 as disclosed in relation to FIG. 2. Hardware processor 501 may be one or more central processing units (CPUs), semiconductor-based microprocessors, and/or other hardware devices suitable for retrieval and execution of instructions stored in machine-readable storage medium 502. Hardware processor 501 may fetch, decode, and execute instructions, such as instructions associated with operations 504-508, to control processes or operations for conveying refrigerated objects between the cab portion and non-cab portion of a dual access refrigeration space. As an alternative or in addition to retrieving and executing instructions, hardware processor 501 may include one or more electronic circuits that include electronic components for performing the functionality of one or more instructions, such as a field programmable gate array (FPGA), application specific integrated circuit (ASIC), or other electronic circuits.

Machine-readable storage medium (media) 502 may be analogous to computer readable medium 208 as disclosed in relation to FIG. 2. A machine-readable storage medium, such as machine-readable storage medium 502, may be any electronic, magnetic, optical, or other physical storage device that contains or stores executable instructions. Thus, machine-readable storage medium 502 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 502 may be a non-transitory storage medium, where the term "non-transitory" does not encompass transitory propagating signals. As described in detail below, machine-readable storage medium 502 may be encoded with executable instructions, for example, instructions associated with operations 504-508.

Machine-readable storage medium (media) 502 is illustrated as storing a method of conveying refrigerated objects between the cab portion and non-cab portion of a dual access refrigeration space, with the method separated into operations 504 through 508.

As used herein, for convenience, the various instructions may be described as performing an operation, when, in fact, the various instructions program processor to perform the operation. Similarly, where a computing device is disclosed as performing an operation, in fact the computing device's associated processor(s) perform the operation upon execution of associated instructions. Further, operations 504-414 are disclosed in a top down order, however this order is not limiting. In some examples, a similar or identical resulting optimization of a serverless workflow may be achieved through a method with the disclosed operations taking place in a different order.

At operation 504, sensor data indicating an external lid has been opened and shut is received by computing component 500. In some examples this indication is derived from signals received from an external lid latch sensor mounted on the dual access refrigeration space. For example, where the external lid is opened by a user accessing the non-cab portion of the refrigeration space, a first signal may be sent by the external lid latch sensor. When the user finishes placing objects within the non-cab portion and closes the external lid, a second signal may be sent to the computing component 500 by the external lid latch sensor. The first signal may indicate that the external lid was opened, while the second signal may indicate that the external lid was closed. Where both signals are received within a given period of time, the lid may have been opened and shut, indicating that objects may have been placed in the non-cab portion of the refrigeration space.

At operation 506, sensor data indicating the presence of objects in the non-cab portion are received by computing component 500. In some examples this indication is derived from a non-cab portion presence sensor mounted in the dual access refrigeration space. For example, where the non-cab portion presence sensor is a scale mounted at the bottom of the non-cab portion, objects placed in the non-cab portion will increase the weight detected by the non-cab portion presence sensor. In examples where the non-cab portion presence sensor is instead a different type of presence detecting technology, e.g., an infrared light obstruction detector, the presence of objects may be detected in different ways. In any case, the non-cab portion presence sensor sends signals indicating the presence of objects in the non-cab portion to the computing component 500.

At operation 508, computing component 500 activates the conveyance system until sensor data indicates objects are present in the cab portion. In some embodiments computing component 500 may send motor control signals to cause rotation of rotors associated with motors within a conveyor belt system making up the conveyance system. In some embodiments, the motors may instead be linear actuators and/or the conveyance system may comprise different technology, e.g., sliding shelves, rotational plates. In any case, activation of the motors within the conveyance system causes the objects present within the non-cab portion to be conveyed to the cab portion of dual access refrigeration space. This may continue until sensor data, e.g., signals from a cab portion presence sensor, indicate the presence of objects within the cab portion. In some embodiments, activation of conveyance system may continue on a set timer, until sensor data indicates that objects have left the non-cab portion, and/or until a user indicates that the conveyance should cease (e.g., via a GUI).

Completion of operations 504-508 results in the conveyance of objects from a non-cab portion to a cab portion of a dual access refrigeration space. Notably a user may load, from an area external to the vehicle's passenger cab, objects into a portion of the dual access refrigerated space not accessible to users within the passenger cabin. After execution of operations 504-508, the user may then access the objects from within the passenger cabin because the objects have been conveyed from the non-cab portion to the cab portion.

In some examples, the direction of conveyance may be reversed, such that objects may be conveyed from the cab portion to the non-cab portion. In some examples, further operations may serve to actuate the lid for the user, via external and/or internal lid actuators. In some examples, further operations may serve to track and maintain refrigeration within the dual access refrigeration space, such as through a temperature gauge and cooling system connected to computing component 500.

Figure 6:
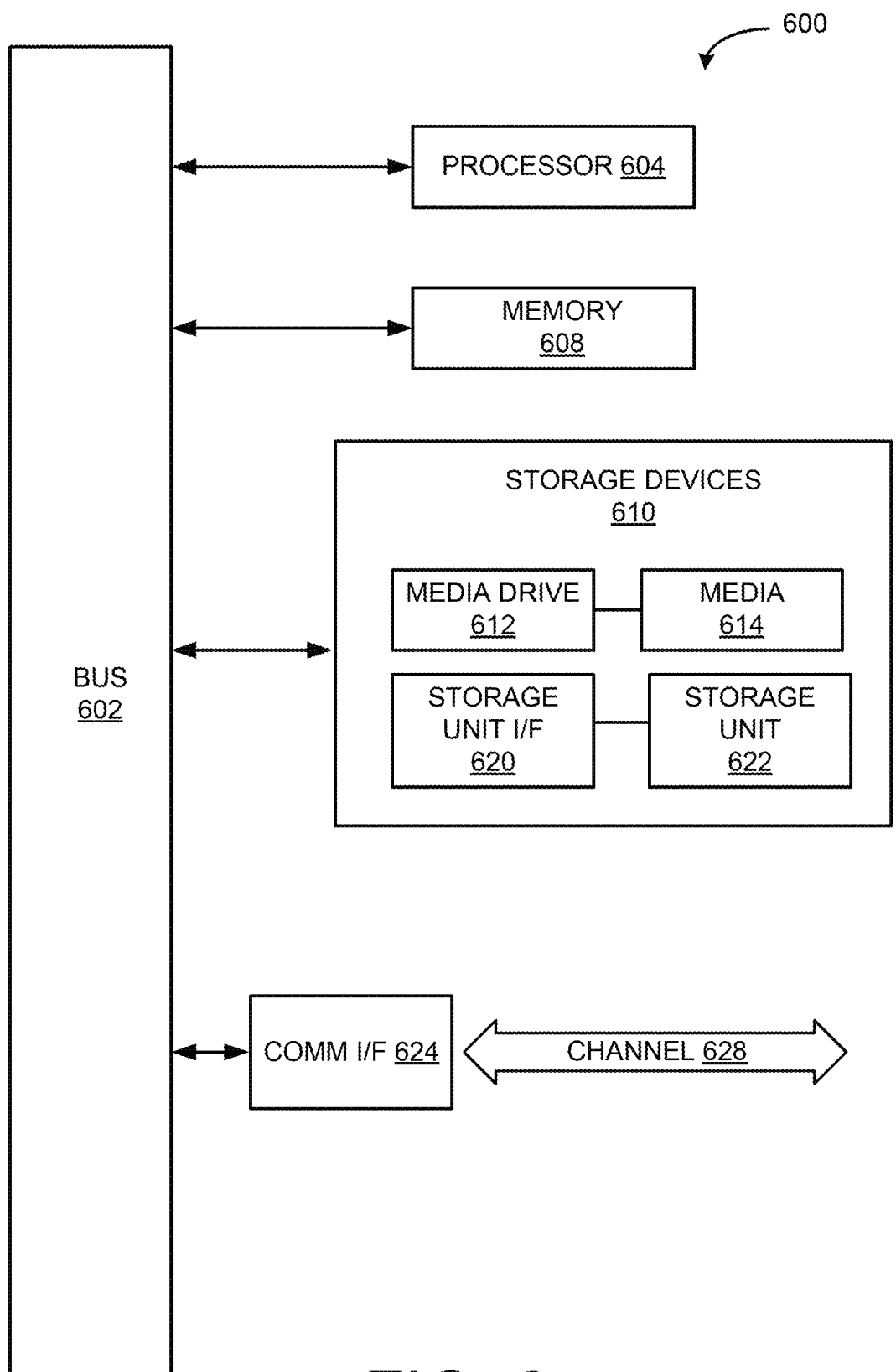
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor, and/or any one or more of the components making up a dual access refrigeration space. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A dual access refrigeration space comprising:
   a cab portion located within a passenger cabin of a vehicle, the cab portion being refrigerated and accessible within the passenger cabin of the vehicle;
   a non-cab portion located outside the passenger cabin of the vehicle, the non-cab portion being refrigerated and accessible outside the passenger cabin of the vehicle; and
   a conveyance system configured to convey objects between the non-cab portion and the cab portion.

2. The dual access refrigeration space of claim 1, further wherein:
   the cab portion is covered by an internal lid, the internal lid capable of being opened by a user within the cab; and
   the non-cab portion is covered by an external lid, the external lid capable of being opened by a user outside the passenger cabin.

3. The dual access refrigeration space of claim 2, further comprising:
   an internal lid actuator communicatively coupled to a dual access refrigeration space control circuit, wherein the internal lid is opened or closed by the dual access refrigeration space control circuit via the internal lid actuator; and
   an external lid actuator communicatively coupled to the dual access refrigeration space control circuit, wherein the external lid is opened or closed by the dual access refrigeration space control circuit via the external lid actuator.

4. The dual access refrigeration space of claim 2, further comprising:
an internal lid latch sensor communicatively coupled to a dual access refrigeration space control circuit, wherein the dual access refrigeration space control circuit detects when the internal lid has been opened or closed via the internal lid latch sensor; and
an external lid latch sensor communicatively coupled to the dual access refrigeration space control circuit, wherein the dual access refrigeration space control circuit detects when the external lid has been opened or closed via the external lid latch sensor.

5. The dual access refrigeration space of claim 1, further comprising:
a cab portion presence sensor communicatively coupled to a dual access refrigeration space control circuit, wherein the dual access refrigeration space control circuit detects the presence of objects within the cab portion via the cab portion presence sensor; and
a non-cab portion presence sensor communicatively coupled to the dual access refrigeration space control circuit, wherein the dual access refrigeration space control circuit detects the presence of objects within the non-cab portion via the non-cab portion presence sensor.

6. The dual access refrigeration space of claim 1, further comprising a temperature gauge communicatively coupled to a dual access refrigeration space control circuit, wherein the dual access refrigeration space control circuit detects a temperature within the dual access refrigeration space.

7. The dual access refrigeration space of claim 1, further comprising a dual access refrigeration space cooling system communicatively coupled to a dual access refrigeration space control circuit, wherein the dual access refrigeration space control circuit increases or decreases a temperature within the dual access refrigeration space via the dual access refrigeration space cooling system.

8. The dual access refrigeration space of claim 1, further comprising a conveyor belt with a motor communicatively coupled to a dual access refrigeration space control circuit, wherein the dual access refrigeration space control circuit conveys objects from the cab portion to the non-cab portion, or from the non-cab portion to the cab portion, via the motor.

9. The dual access refrigeration space of claim 1, further wherein the conveyance system comprises a spring and cable system.

10. A method comprising:
receiving, at a processor, a first sensor data indicating an external lid of a dual access refrigeration space has been opened and closed;
receiving, at a processor, a second sensor data indicating the presence of objects within a non-cab portion of the dual access refrigeration space;
after receiving the first and second sensor data, sending control data to a conveyance system within the dual access refrigeration space to convey objects within the non-cab portion of the dual access refrigeration space to a cab portion of the dual access refrigeration space; and
after receiving sensor data indicating the presence of objects within the cab portion of the dual access refrigeration space, sending control data to the conveyance system to cease conveying objects from the non-cab portion of the dual access refrigeration space to the cab portion of the dual access refrigeration space.

* * * * *